US007533048B2

(12) United States Patent
Madhavan et al.

(10) Patent No.: US 7,533,048 B2
(45) Date of Patent: May 12, 2009

(54) FAIR VALUE MODEL BASED SYSTEM, METHOD, AND COMPUTER PROGRAM PRODUCT FOR VALUING FOREIGN-BASED SECURITIES IN A MUTUAL FUND

(75) Inventors: Ananth Madhavan, New York, NY (US); Jian Yang, Sharon, MA (US); Leonid Zosin, Waltham, MA (US); Konstantin Zalutsky, Bethlehem, PA (US); Artem Asriev, Winchester, MA (US); Gabriel Butler, Somerville, MA (US)

(73) Assignee: ITG Software Solutions, Inc., Culver City, CA (US)

( * ) Notice: Subject to any disclaimer, the term of this patent is extended or adjusted under 35 U.S.C. 154(b) by 1043 days.

(21) Appl. No.: 10/405,640

(22) Filed: Apr. 3, 2003

(65) Prior Publication Data

US 2004/0210502 A1 Oct. 21, 2004

(51) Int. Cl.
*G06Q 40/00* (2006.01)
(52) U.S. Cl. .................................... 705/36 R; 705/35
(58) Field of Classification Search .................. 705/35, 705/36 R
See application file for complete search history.

(56) References Cited

OTHER PUBLICATIONS

Business Editors. "Mutual Funds Address Fair Value Pricing with Analytics from ITG; New Product Delivers Security Price Adjustments for Modifying Net Asset Value for International Funds". Business Wire. New York: Mar. 18, 2003. p. 1.*

Business/Technology Editors. "FT Interactive Data Introduces Fair Value Evaluation Service; Designed to Help Mutual Fund Industry Address Guidance of SEC Staff's Apr. 30, 2001 Letter". Business Wire. New York: Feb. 26, 2002. p. 1.*
Larkin, Patrick. "Mutual-Fund Pricing Faces Scrutiny After Asian Tumble". Cincinatti Post. Cincinnati, Ohio: Nov. 15, 1997. p. 7B.*

* cited by examiner

Primary Examiner—Lalita M Hamilton
(74) Attorney, Agent, or Firm—Rothwell, Figg, Ernst & Manbeck, P.C.

(57) ABSTRACT

A method for determining fair value prices of financial securities of international markets includes the steps of selecting a universe of securities of a particular international market; computing overnight returns of each security in the selected universe over a predetermined past period of time; selecting at least one return factor of a domestic financial market from a plurality of return factors; computing, for each selected return factor, the return factor's daily return over said predetermined past period of time; calculating, for each selected return factor, a return factor coefficient for each security in the selected universe by performing a time series regression to obtain the contribution of each return factor's return to the security's overnight return; and storing each calculated return factor coefficient in a data file; wherein the stored return factor coefficients can be used in conjunction with current return factor daily return values to predict current overnight returns for all securities in the selected universe of securities, which predicted current overnight returns can be used in conjunction with closing prices on said particular international market of each security of said selected universe to determine a fair value price of each security of the selected universe. A system and computer program product for implementing the method also are provided.

38 Claims, 4 Drawing Sheets

FAIR VALUE MODEL BASED SYSTEM, METHOD, AND COMPUTER PROGRAM PRODUCT FOR VALUING FOREIGN-BASED SECURITIES IN A MUTUAL FUND

BACKGROUND OF THE INVENTION

1. Field of the Invention

This invention relates generally to the field of securities trading, and more specifically to a system, method, and computer program product for fairly and accurately valuing mutual funds having foreign-based or thinly traded assets.

2. Background of the Invention and Prior Art

Open-end mutual funds provide retail investors access to a diversified portfolio of securities at low cost. These funds offer investors liquidity on a daily basis, allowing them to trade fund shares to the mutual fund company. The price at which these transactions occur is typically the fund's Net Asset Value (NAV) computed on the basis of closing prices for the day of all securities in the fund. Thus, fund trade orders received during regular business hours are executed the next business day, at the NAV calculated at the close of business on the day the order was received. For mutual funds with foreign or thinly traded assets, however, this practice can create problems because of time differences between the foreign markets' business hours and the local (e.g. U.S.) business hours of the mutual fund.

If NAV is based on stale prices for foreign securities, short-term traders can profit substantially by trading on news in the U.S. at the expense of the shareholders that remain in the fund. In particular, excess returns of 2.5, 9-12, 8 and 10-20 percent have been reported for various strategies suggesting, respectively, 4, 4, 6 and unlimited number of roundtrip trades of international funds per year; At least 16 hedge fund companies covering 30 specific funds exist whose stated strategy is "mutual fund timing." Traditionally, funds have widely used short-term trading fees to limit trading timing profit opportunities, but the fees are neither large enough nor universal enough to protect long-term investors and profit opportunities remain even if such fees are used. Complete elimination of the trading profit opportunity through fees alone would require very high short-term trading fees, which may not be embraced by investors.

This problem has been known in the industry for some time, but in the past was of limited consequence because it was somewhat difficult to trade funds with international holdings. Funds' order submission policies required sometimes up to several days for processing, which did not allow short-term traders to take advantage of NAV timing situations. However, with the significant increase of Internet trading in recent years this barrier has been eliminated.

Short-term trading profit opportunities in international mutual funds are not as much of an informational efficiency problem as an institutional efficiency problem, which suggests that changes in mutual fund policies represent a solution to this problem. Further, the Investment Company Act of 1940 imposes a regulatory obligation on mutual funds and their directors to make a good faith determination of the fair value of the fund's portfolio securities when market quotations are not readily available. These concerns are relevant for stocks, bonds, and other financial instruments, especially those that are thinly traded.

It has been demonstrated that international equity returns are correlated at all times, even when one of the markets is closed, and the magnitude of the correlations may be very large. As a result, there are large correlations between observed security prices during the U.S. trading day and the next day's return on the international funds. However, according to a recent survey, only 13 percent of funds use some kind of adjustment. But even so, the adjustments adopted by some mutual funds are flawed, such that the arbitrage opportunities are not reduced at all.

Consequently, there is a present need for fair value calculations that make adjustments to closing prices for liquidity, time zone, and other factors. Of these, time-zone adjustments have been noted as one of the most important challenges to mutual fund custodians.

SUMMARY OF THE INVENTION

The present invention solves the existing need in the art by providing a system, method, and computer program product for computing the fair value of financial securities trading on international markets by making certain adjustments for time-zone differences between the time zone of the fund making the NAV computations and the time zone of the market(s) in which the financial securities are traded.

In particular, according to a first aspect of the present invention a method for determining fair value prices of financial securities of international markets is provided, including the steps of selecting a universe of securities of a particular international market; computing overnight returns of each security in the selected universe over a predetermined past period of time; selecting at least one return factor of a domestic financial market from a plurality of return factors; computing, for each selected return factor, the return factor's daily return over said predetermined past period of time; calculating, for each selected return factor, a return factor coefficient for each security in the selected universe by performing a time series regression to obtain the contribution of each return factor's return to the security's overnight return; and storing each calculated return factor coefficient in a data file; wherein the stored return factor coefficients can be used in conjunction with current return factor daily return values to predict current overnight returns for all securities in the selected universe of securities, which predicted current overnight returns can be used in conjunction with closing prices on the particular international market of each security of the selected universe to determine a fair value price of each security of the selected universe.

According to a second aspect of the invention, a system is provided for carrying out the method of calculating a fair value price, and according to a third aspect of the invention a computer program product having computer-executable instructions stored on a computer-readable storage medium is provided to enable a programmable computer to carry out the inventive method.

DETAILED DESCRIPTION OF THE PREFERRED EMBODIMENTS

Figure 1:
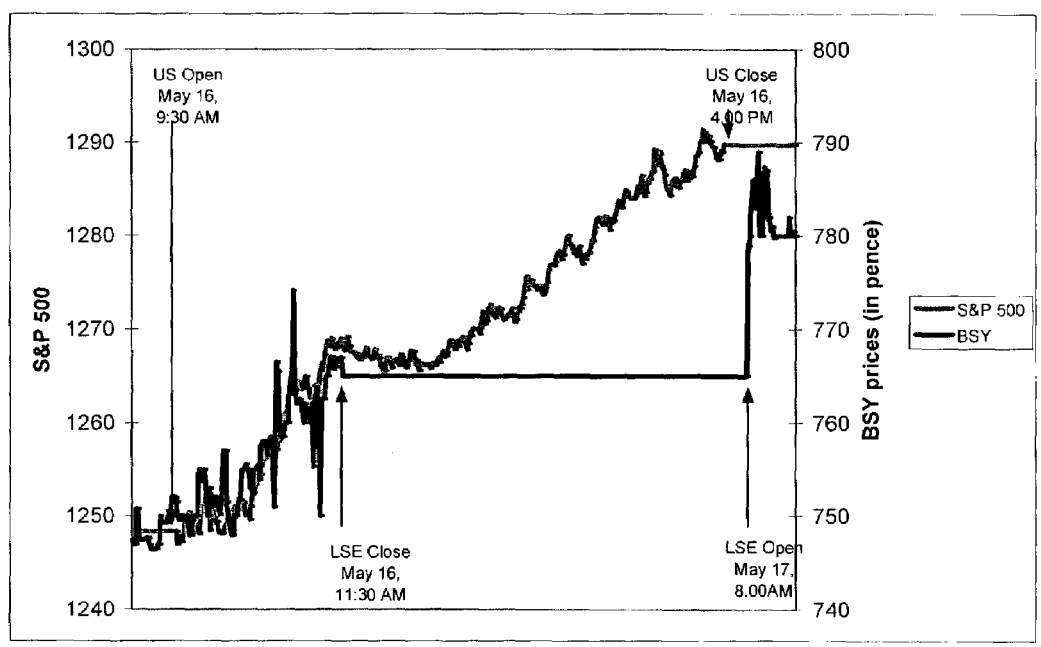
FIG. 1 is a graph illustrating how an international security may be inaccurately priced by a domestic mutual fund in computing the fund's Net Asset Value.

A general principle of the invention is illustrated by referring to FIG. 1. NAV of mutual fund shares is typically calculated at 4:00 p.m. Eastern Time (ET), i.e., at the close of the U.S. financial markets (including the NYSE, ASE, and NASDAQ markets). This is well after many, if not most, foreign markets already have closed. Thus, events, news and other information observed between the close of the foreign market and 4:00 p.m. ET may have an effect on the opening price of foreign securities on the next business day (and thus is likely also to have an effect on the next day's closing price), that is not reflected in the calculated NAV based on the current day's closing price.

FIG. 1 illustrates an example of the opportunity for trading profit. Stock BSY (British Sky Broadcasting PLC) is traded on the London Stock Exchange (LSE). On May 16, 2001, the stock closed at 767 pence at 11:30 a.m. ET. After the LSE's close, the US stock market had a significant increase—between 11:30 a.m. and 4 p.m. ET, the S&P 500 Index had risen by 1.6%. As seen from the chart, during the time that both the LSE and the U.S. stock exchanges were open, the price of BSY had a high correlation with the S&P 500 Index. The closing price of BSY obviously did not reflect the increase of the U.S. market between 11:30 a.m. and 4:00 p.m. ET. But BSY's next day opening price increased by 1.56% (to 779 pence) due mostly to the U.S. market rise the previous day. An obvious arbitrage strategy would have suggested buying a mutual fund that included stock BSY on May 16, with the fund's NAV based on BSY's closing price of 767, and then selling it on the next day. This is a very efficient and low-risk strategy, since most likely BSY's closing price for May 17 would have been higher as a result of the higher opening price. To exclude the possibility of such an arbitrage, BSY's closing price for May 16 could be adjusted to a "fair" price based on a Fair Value Model (FVM).

Because there is no direct observation of the fair value price of a foreign stock at 4 p.m. ET, the next day opening price is commonly used as a proxy for a "fair value" price. Such a proxy is not a perfect one, however, since there is a possibility of events occurring between 4 p.m. ET and the opening of a foreign market, which may change stock valuations. However, there is no reason to believe that the next day opening price proxy introduces any systematic positive or negative bias.

The goal of FVM research is to identify the most informative factors and the most efficient framework to estimate fair prices. The goal assumes also a selection of criteria to facilitate the factor selection process. In other words, it needs to be determined whether factor X needs to be included in the model while factor Y doesn't add any useful information, or why framework A is more efficient than framework B. Unlike a typical optimization problem, there is no single criterion for the fair value pricing problem.

Several different statistics reflect different requirements for FVM performance and none of them can be seen as the most important one. Therefore a decision on selection of a set of factors and a framework should be made when all or most of the statistics clearly suggest changes in the model when compared with historical data. All the criteria or statistics are considered below.

There are many factors which can be used in FVM: the U.S. intra-day market and sector returns, currency valuations, various types of derivatives—ADRs (American Depository Receipts), ETFs (Exchange Traded Funds), futures, etc. The following general principles are used to select factors for the FVM:

- economic logic—factors must be intuitive and interpretable;
- the factors must make a significant contribution to the model's in-sample (i.e., historical) performance;
- the factors must provide good out-of-sample or back-testing performance.

It must be understood that good in-sample performance of factors does not guarantee a good model performance in actual applications. The main purpose of the model is to provide accurate forecasts of fair value prices or their proxies—next day opening prices. Therefore, only factors that have a persistent effect on the overnight return can be useful. One school of thought holds that the more factors that are included in the model, the more powerful the model will be. This is only partly true. The model's in-sample fit may be better by including more parameters in the model, but this does not guarantee a stable out-of-sample performance, which should be the most important criterion in developing the model. Throwing too many factors into the model (the so-called "kitchen sink" approach) often just introduces more noise, rather than useful information.

In the equations that follow, the following notations are used:

$r_i$ is the overnight return for stock i in a foreign market, which is defined as the percentage change between the price at the foreign market close and that market's price at the open on the next day;

m is the snapshot U.S. market return between the closing of a foreign market and the U.S. closing using the market capitalization-weighted return based on Russell 1000 stocks as a proxy;

$s_j$ is the snapshot excess return of the j-th U.S. sector over the market return, where the return is measured between the closing of a foreign market and the U.S. closing, again using the Russell 1000 sector membership as a proxy, where sector is selected appropriately;

$\epsilon$ represents price fluctuations.

In developing an optimized fair value model, the following statistics should be considered. These statistics measure the accuracy of a fair value model in forecasting overnight returns of foreign stocks by measuring the results obtained by the fair value model using historical data with a benchmark.

Average Arbitrage Profit (ARB) measures the profit that a short-term trader would realize by buying and selling a fund with international holdings based on positive information observed after the foreign market close. Thus, when a fund with international holdings computes its net asset value (NAV) using stale prices, short-term traders have an arbitrage opportunity. To take advantage of information flow after the foreign market close, such as a large positive U.S. market move, the arbitrage trader would take a long overnight position in the fund so that on the next day, when the foreign market moves upwards, the trader would sell his position to realize the overnight gain. However, once a fair value model is utilized to calculate NAV, any profit realized by taking an overnight long position represents a discrepancy between the actual overnight gain and the calculated fair value gain. A correctly constructed Fair Value Model should significantly minimize such arbitrage opportunities as measured by the out-of-sample performance measure as $$\text{Arbitrage Profit with } FVM\ (ARB) = \frac{1}{T}\sum_{m\geq 0}(q_t - \hat{q}_t) + \frac{1}{T}\sum_{m<0}(\hat{q}_t - q_t), \quad (1)$$

$$\text{Arbitrage Profit without } FVM = \frac{1}{T}\sum_{m\geq 0}q_t - \frac{1}{T}\sum_{m<0}q_t, \quad (2)$$

where T is the number of out-of-sample periods, $q_t$ is the overnight return of an international fund at time t, and $\hat{q}_t$ is the forecasted return by the fair value model.

The above statistics provide average arbitrage profits over all the out-of-sample periods regardless of whether there has been a significant market move. A more informative approach is to examine the average arbitrage profits when the U.S. market moves significantly. Without loss of generality, we define a market move as significant if it is greater in magnitude than half of the standard deviation of daily market return.

Arbitrage Profit with FVM for Large Moves $$(ARBBIG) = \frac{1}{T_{lp}}\sum_{m\geq\sigma/2}(q_t - \hat{q}_t) + \frac{1}{T_{lp}}\sum_{m\leq-\sigma/2}(\hat{q}_t - q_t), \quad (3)$$

Arbitrage Profit without FVM for Large Moves = (4)

$$\frac{1}{T_{lp}}\sum_{m\geq\sigma/2}q_t - \frac{1}{T_{lp}}\sum_{m\leq-\sigma/2}q_t,$$

where σ is the standard deviation of the snapshot U.S. market return and $T_{lp}$ is the number of large positive moves (i.e. the number of times $m \geq \sigma/2$). The surviving observations cover approximately 60% of the total number of trading days. The arbitrage profit statistics are calculated as follows:

for any given stock and any given estimation window, run the regression and compute the forecasted overnight return;

compute the deviation of the realized overnight returns from the forecasted returns;

depending on the size of U.S. market moves, take the appropriate average of the deviation over a selected stock universe and over all estimation windows.

It is to be noted that the arbitrage profit statistic is potentially misleading. This happens when the fair value model over-predicts the magnitude of the overnight return, and thus reduces the arbitrage profit because such over-prediction would result in a negative return on an arbitrage trade. For this reason, use of arbitrage profit does not lead to a good fair value model because the fair value model should be constructed to reflect as accurately as possible the effect of observe information on asset value rather than to reduce arbitrage profit.

Mean Absolute Error (MAE). While mutual funds are very concerned with reducing arbitrage opportunities, the SEC is just as concerned with fair value issues that have a negative impact on the overnight return of a fund with foreign equities. This information is useless to the arbitrageur because one cannot sell short a mutual fund. Nonetheless, evaluation of a fair value model must consider all circumstances in which the last available market price does not represent a fair price in light of currently available information. MAE measures the average absolute discrepancy between forecasted and realized overnight returns:

$$\text{Mean Absolute Error with } FVM\ (MAE) = \frac{1}{T}\sum|r_t - \hat{r}_t|, \quad (5)$$

$$\text{Mean Absolute Error without } FVM = \frac{1}{T}\sum|r_t|. \quad (6)$$

The MAE calculation involves the following steps:

for any given stock and any given estimation window, run the regression and compute the forecasted overnight return;

compute the absolute deviation between the realized and the forecasted overnight returns;

take an average of the absolute deviation over a selected universe and over all estimation windows.

Time-series out-of-sample correlation between forecasted and realized returns (COR) measures whether the forecasted return of a given stock varies closely related to the variation of the realized return. It can be computed as follows:

for any given stock and any given estimation window, run the regression and compute the forecasted overnight return and obtain the actual realized return;

keep the estimation window rolling to obtain a series of forecasted returns and a series of realized returns for this stock and compute the correlation between the two series;

take an average over a selected stock universe.

Hit ratio (HIT) measures the percentage of instances that the forecasted return is correct in terms of price change direction:

for any given stock and any given estimation window, run the regression and compute the forecasted overnight return;

define a dummy variable, which is equal to one if the realized and the forecasted overnight returns have the same sign (i.e., either positive or negative) and equal to zero otherwise;

take an average of the defined dummy variable over a selected stock universe and over all estimation windows.

Similar to how ARBBIG is defined above, it is more useful to calculate the statistics only for large moves. Values of HIT in the tables in the Appendix below are calculated for all observations. The methodology for obtaining an optimized Fair Value Model are now described.

The overnight returns of foreign stocks are computed using Bloomberg pricing data. The returns are adjusted if necessary for any post-pricing corporate actions taken.

The FVM universe covers 41 countries with the most liquid markets (see all the coverage details in Appendix 1), and assumes Bloomberg sector classification including the following 10 economic sectors: Basic Materials, Communications, Consumer Cyclical, Consumer Non-cyclical, Diversified, Energy, Financial, Industrial, Technology and Utilities.

Since all considered frameworks are based on overnight returns, it is important to determine if overnight returns behave differently for consecutive trading days versus non-consecutive days. Such different behavior may reflect a correlation between length of time period from previous trading day closing and next trading day opening and corresponding volatility. If such difference can been established, a fair value model would have to model these two cases differently. To address this issue, the average absolute value of the overnight returns for any given day was used as the measure of overnight volatility and information content. The analysis, however, demonstrated that there is no significant difference between the overnight volatility of consecutive trading days and non-consecutive trading days for all countries (see results of the study in Appendix 2). These results are consistent with several studies, which demonstrate that volatility of stock returns is much lower during non-trading hours.

The following regression models are examples of possible constructions of a fair value model according to the invention. In the following equations, the return of a particular stock is fitted to historical data over a selected time period by calculating coefficients β, which represent the influence of U.S. market return or U.S. sector return on the overnight return of the particular foreign stock. The factor ϵ is included to compensate for price fluctuations.

Model 1 (Market and Sector Model):

$$r_i = \beta^m m + \beta^s s_j \epsilon$$

Model 1 assumes that the overnight return is determined by the U.S. snapshot market return m and the respective snapshot sector return $s_j$.

Model 2 (Market Model):

$$r_i = \beta^m m + \epsilon$$

Model 2 is similar to Capital Asset Pricing Model (CAPM) and is a restricted version of Model 1.

Figure 2:
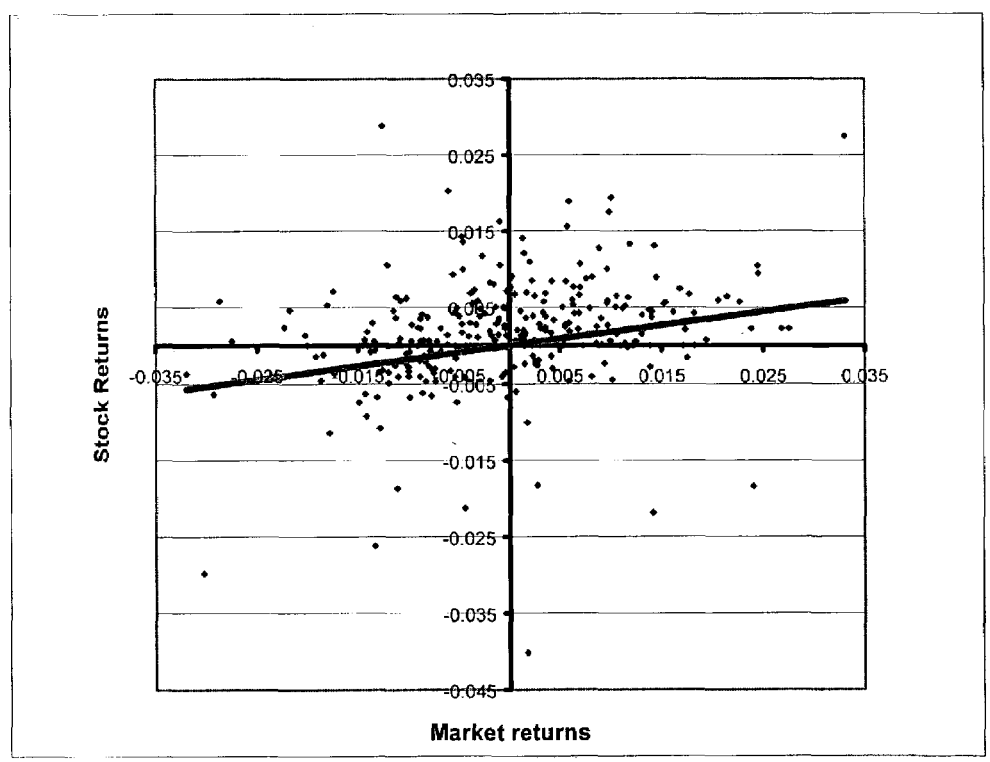
FIG. 2 is a graph illustrating the use of a time-series regression to construct a fair value model of an international security's overnight returns when compared against a benchmark return factor, such as a snapshot U.S. market return.

FIG. 2 illustrates how regression of a stock's overnight return on the U.S. snapshot return can be built. The observations were taken for Australian stock WPL (Woodside Petroleum Ltd.) for the period between Jan. 18, 2001 and Mar. 21, 2002.

Model 3 (Sector Model):

$$r_i = \beta^s(s_j + m) + \epsilon$$

Model 3 is based on the theory that the stock return is only affected by sector return. The term $s_j + m$ represents the sector return rather than the sector excess return. The sector can be selected based on various rules, as described below.

Model 4 (Switching Regression Model)

It may be possible that a stock's price reacts to market and sector changes as a function of the magnitude of the market return. Intuitively, asset returns might exhibit higher correlation during extreme market turmoil (so-called systemic risk). Such behavior can be modeled by the so-called switching regression model, which is a piece-wise linear model as a generalization of a benchmark linear model. Taking Model 1 as the benchmark model, a simple switching model is described as follows $$r_i = \begin{cases} \beta_i^m m + \beta_i^s s_j + \varepsilon, & \text{if } |m| \leq c; \\ (\beta_i^m + \delta_i^m)m + (\beta_i^s + \delta_i^s)s_j + \varepsilon, & \text{if } |m| > c. \end{cases}$$

This model assumes the sensitivities of stock return $r_i$ to the market and the sector are $\beta_i^m$ and $\beta_i^s$ if the market change is less than the threshold c in magnitude. However, when the market fluctuates significantly, the sensitivities become $\beta_i^m + \delta_i^m$ and $\beta_i^s + \delta_i^s$ respectively. Alternately, multiple thresholds can be specified, which would lead to more complicated model structures but not necessarily better out-of-sample performances.

Although this model specifies the stock return as a non-linear function of market and sector returns, if we define a "dummy" variable $$d = \begin{cases} 0, & \text{if } |m| \leq c; \\ 1, & \text{if } |m| > c; \end{cases}$$

the switching regression model becomes a linear regression $$r_i = \beta_{im} m + \delta_{im}(m*d) + \beta_{is} s_i + \delta_{is}(s_i*d) + \epsilon_i.$$

Standard tests to determine whether the sensitivities are different as a function of different magnitudes of market changes are t-statistics on the null hypotheses $\delta_i^m = 0$ and $\delta_i^s = 0$.

According to the invention, once a fair value regression model is constructed using one or more selected factors as described above, an estimation time window or period is selected over which the regression is to be run. Historical overnight return data for each stock in the selected universe and corresponding U.S. market and sector snapshot return data are obtained from an available source, as is price fluctuation data for each stock in the selected universe. The corresponding β coefficients are then computed for each stock, and are stored in a data file. The stored coefficients are then used by fund managers in conjunction with the current day's market and/or sector returns and price fluctuation factors to determine an overnight return for each foreign stock in the fund's portfolio of assets, using the same FVM used to compute the coefficients. The calculated overnight returns are then used to adjust each stock's closing price accordingly, in calculating the fund's NAV.

Figure 3:
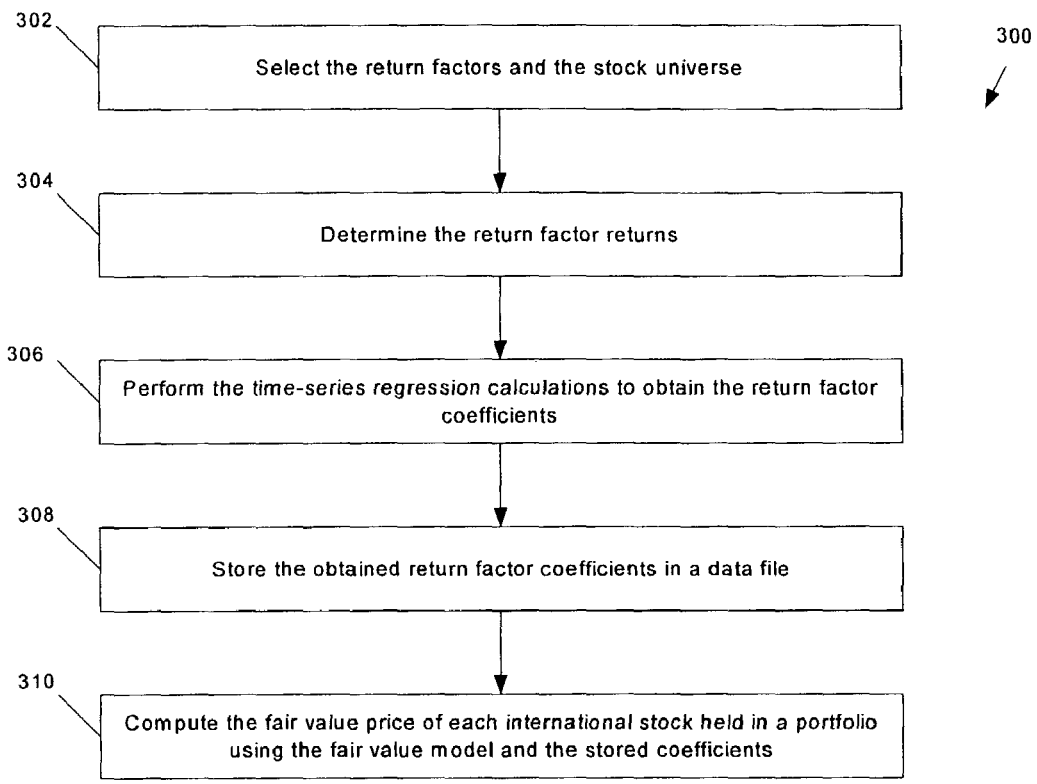
FIG. 3 is a flow diagram illustrating a process for determining the fair value price of international securities according to a preferred embodiment of the invention.

FIG. 3 is a flow diagram of a general process 300 for determining a fair value price of an international security according to one preferred embodiment of the invention. At step 302, the stock universe (such as the Japanese stock market) and the return factors as discussed above are selected. At step 304, the overnight returns of the selected return factors are determined using historical data. At step 306, the β coefficients are determined using time-series regression. At step 308, the obtained β coefficients are stored in a data file. At step 310, fair value pricing of each security in a particular mutual fund's portfolio is calculated using the fair model constructed of the selected return factors, the stored coefficients, and the actual current values of the selected return factors, in order to obtain the projected overnight return of each security. The projected overnight return thus obtained is used to adjust the last closing price of each corresponding international security accordingly, so as to obtain the fair value price to be used in calculating the fund's NAV.

Figure 4:
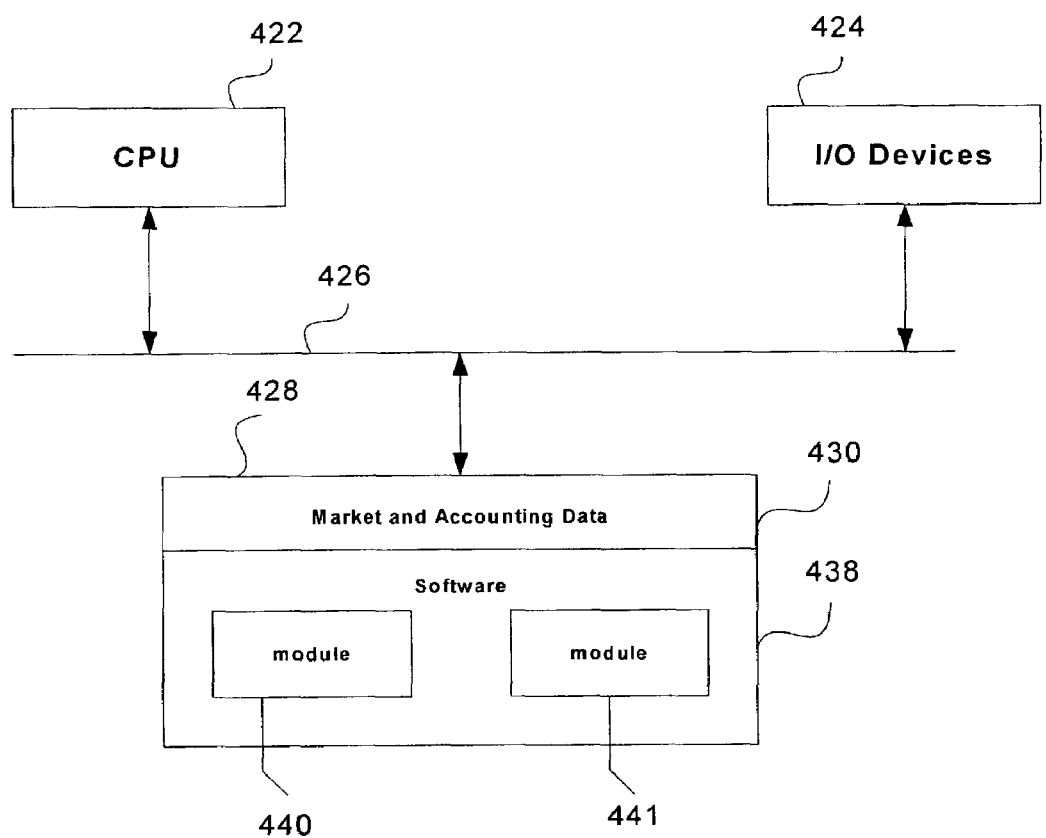
FIG. 4 is a block diagram of a system (such as a data processing system) for implementing the process according to a preferred embodiment of the invention.

FIG. 4 shows a general purpose computer 420 that can be used to implement a method according to a preferred embodiment of the invention. The computer 420 includes a central processing unit (CPU) 422, which communicates with a set of input/output (I/O) devices 424 over a bus 426. The I/O devices 424 may include a keyboard, mouse, video monitor, printer, etc.

The CPU 422 also communicates with a computer-readable storage medium (e.g., conventional volatile or non-volatile data storage devices) 428 (hereafter "memory 428") over the bus 426. The interaction between a CPU 422, I/O devices 424, a bus 426, and a memory 428 are well known in the art.

Memory 428 can include market and accounting data 430, which includes data on stocks, such as stock prices, and data on corporations, such as book value.

The memory 428 also stores software 438. The software 438 may include a number of modules 440 for implementing the steps of process 300. Conventional programming techniques may be used to implement these modules. Memory 428 can also store the data file(s) discussed above.

The sector for Models 1, 2, 4 can be selected by different rules described as follows.

a) Sector determined by membership: The sector by membership usually does not change over time if there is no significant switch of business focus.

b) Sector associated with largest $R^2$: This best-fitting sector by $R^2$ changes over different estimation windows and depends on the specific sample. It usually provides higher in-sample fitting results by construction but not necessarily better out-of-sample performance. This approach is motivated by observing that the sector classification might not be adaptive to fully reflect the dynamics of a company's changing business focus.

c) Sector associated with the highest positive t-statistic: Once again, this best-fitting sector changes over different estimation windows and depends on the specific sample. It has the same motivation as the prior sector selection approach. In addition, it is based on the prior belief that sector return usually has positive impact on the stock return.

Models 1, 2, 4 may use one of these types of selection rules; in exhibits of Appendix 3 they are referenced as 1b or 2c, indicating the sector selection method.

To evaluate fair value model performance for different groups of stocks, all models defined above have been run, the market cap-weighted $R^2$ values were computed for different universes, and an average was taken over all estimation windows. Each estimation window for each stock includes the most recent 80 trading days. The parameter selected after several statistical tests was chosen as the best value, representing a trade-off between having stable estimates and having estimates sensitive enough for the latest market trends. Tables 3.1, 3.2, and 3.3 present the results using Model 1 a, Model 1 b, and Model 1c. Results on the other models suggest similar pattern and are not presented here.

The results clearly suggest that all the models work better for large cap stocks than for small cap stocks. In addition, it can be observed that the $R^2$ values of Model 1b are the highest by construction and the $R^2$ values of Model 1a are the lowest.

Standard statistical testing has been implemented to examine whether switching regression provides a more accurate framework to model fair value price. One issue arising with the switching regression model is how to choose the threshold parameter. Since it is known that the selection of the threshold does not change the testing results dramatically as long as there are enough observations on each side of the threshold, we chose the sample standard deviation as the threshold. Therefore, approximately one-third of the observations are larger than the threshold in magnitude. Appendix 4 presents the percentages of significant positive δ using Model 2 as the benchmark. It shows that only a small percentage of stocks support a switching regression model.

As mentioned above, back-testing performance is an important part of the model performance evaluation. All back-testing statistics presented below are computed across all the estimation windows and all stocks in a selected universe. The average across all stocks in a selected universe can be interpreted as the statistics of a market cap-weighted portfolio across the respective universe. Appendix 7 contains all the results for selected countries representing different time zones with the most liquid markets, while Appendices 5 and 6 contain selected statistics for comparison purposes.

The out-of-sample performance was evaluated for all models containing a sector component and the pre-specified economic sector model performed the best. It is generally associated with the smallest MAE, the highest HIT ratio, and the largest correlation (COR).

Table 6.1 of Appendix 6 presents the MAE, HIT, and COR statistics of models with pre-specified sectors for top 10% stocks. It shows that model 2 performs the best.

Table 6.2 summarizes the arbitrage profit statistics of model 2 for top 10% stocks in each of the countries. However, it is noted that all the models perform very well in terms of reducing arbitrage profit.

Table 6.2 of Appendix 6 also shows that less arbitrage profit can be made by short-term traders for days with small market moves. Consequently, fund managers may wish to use a fair value model only when the U.S. market moves dramatically.

Appendix 8 is included to demonstrate that the naïve model of simply applying the U.S. intra-day market returns to all foreign stocks closing prices does not reflect fair value prices as accurately as using regression-based models.

The US Exchange Traded Funds (ETF) recently have played an increasingly important role on global stock markets. Some ETFs represent international markets, and since they may reflect a correlation between the US and international markets, it might expected that they may be efficiently used for fair value price calculations instead of (or even in addition) to the U.S. market return. In other words, one may consider Model 2'' (ETF Model):

$$r_i = \beta^e e + \epsilon$$

where e is a country-specific ETF's return, or

Model 2''' (Market and ETF Model):

$$r_i = \beta^m m + \beta^e e + \epsilon$$

The back-testing results, however, don't indicate that model 2'' performs visibly better than Model 2. Addition of ETF return to Model 2 in Model 2''' does not make a significant incremental improvement either. Poor performance of ETF-based factors can be explained by the fact that country-specific ETFs are not sufficiently liquid. Some ETFs became very efficient and actively used investment instruments, but country-specific ETFs are not that popular yet. For example, EWU (ETF for the United Kingdom) is traded about 50 times a day, EWQ (ETF for France)—about 100 times a day, etc. The results of the tests for ETFs are included in the Appendix 9.

Some very liquid international securities are represented by an ADR in the U.S. market. Accordingly, it may be expected that the U.S. ADR market efficiently reflects the latest market changes in the international security valuations. Therefore, for liquid ADRs, the ADR intra-day return may be a more efficient factor than the U.S. market intra-day return. This hypothesis was tested and some results on the most liquid ADRs for the UK are included in Appendix 10. They suggest that for liquid securities ADR return may be used instead of the U.S. market return in Model 2.

As demonstrated above, it is reasonable to expect that different frameworks work differently for different securities. For example, as described above, for international securities represented in the U.S. market by ADRs it is more efficient to use the ADR's return than the U.S. market return, since theoretically the ADR market efficiently accounts for all specifics of the corresponding stock and its correlation to the U.S. market. Some international securities such as foreign oil companies, for example, are expected to be very closely correlated with certain U.S. sector returns, while other international securities may represent businesses that are much less dependent on the U.S. economy. Also, for markets which close long before the U.S. market opening, such as the Japanese market, the fair value model may need to implement indices other than the U.S. market return in order to reflect information generated during the time between the close of the foreign market and the close of the U.S. market.

Such considerations suggest that the framework of the fair value model should be both stock-specific and market-specific. All appropriate models described above should be applied for each security and the selection should be based on statistical procedures.

The fair value model according to the invention provides estimates on a daily basis, but discretion should be used by fund managers. For instance, if the FVM is used when U.S. intra-day market return is close to zero, adjustment factors are very small and overnight return of international securities reflect mostly stock-specific information. Contrarily, high intra-day U.S. market returns establish an overriding direction for international stocks, such that stock-specific information under such circumstances is practically negligible, and the FVM's performance is expected to be better. Another approach is to focus on adjustment factors rather than the US market intra-day return and make decisions based on their absolute values. Table 11.1 and 11.2 from Appendix 11 provide results of such test for both approaches. The test was applied to the FTSE 100 stock universe for the time period between April 15 and Aug. 23, 2002. The results demonstrate that FVM is efficient if it is used for all values of returns or adjustment factors.

APPENDICES

Appendix 1 FVM Coverage

| Country/Exchange | Country/Exchange code | FVM Universe Size (as of Sep. 01, 2002) |
|---|---|---|
| Australia | AUS | 609 |
| Austria | AUT | 55 |
| Belgium | BEL | 91 |
| China | CHN | 1263 |
| Czech Republic | CZE | 7 |
| Denmark | DNK | 65 |
| Egypt | EGY | 52 |
| Germany | DEU | 320 |
| Finland | FIN | 91 |
| France | FRA | 672 |
| Greece | GRC | 338 |
| Hong Kong | HKG | 500 |
| Hungary | HUN | 23 |
| India | IND | 1178 |

-continued

| Country/Exchange | Country/Exchange code | FVM Universe Size (as of Sep. 01, 2002) |
|---|---|---|
| Indonesia | IDN | 97 |
| Ireland | IRL | 28 |
| Israel | ISR | 106 |
| Italy | ITA | 307 |
| Japan | JPN | 2494 |
| Jordan | JOR | 39 |
| Korea | KOR | 1611 |
| Malaysia | MYS | 556 |
| Netherlands | NLD | 140 |
| New Zealand | NZL | 69 |
| Norway | NOR | 82 |
| Philippines | PHL | 37 |
| Poland | POL | 133 |
| Portugal | PRT | 41 |
| Singapore | SGP | 254 |
| Spain | ESP | 117 |
| Sweden | SWE | 223 |
| Switzerland | CHE | 193 |
| Taiwan | TWN | 938 |
| Thailand | THA | 226 |
| Turkey | TUR | 288 |
| South Africa | ZAF | 179 |
| United Kingdom | GBR | 1092 |
| EuroNext (Ex.) | ENM | 245 |
| London Int. (Ex.) | LIN | 23 |
| Vertex (Ex.) | VXX | 28 |

Appendix 2 Overnight Volatility for Consecutive and Non-consecutive Trading Days

TABLE 2.1

Summary statistics of over-night returns for consecutive and non-consecutive trading days

| Country | Sub-sample | Samples | Mean | Std. Dev. | Minimum | Maximum |
|---|---|---|---|---|---|---|
| AUS | Consecutive | 184 | 0.0072 | 0.0044 | 0.0037 | 0.0516 |
|  | Non-conseq. | 54 | 0.0066 | 0.0030 | 0.0034 | 0.0244 |
| DEU | Consecutive | 189 | 0.0134 | 0.0040 | 0.0080 | 0.0360 |
|  | Non-conseq. | 51 | 0.0132 | 0.0036 | 0.0082 | 0.0270 |
| FRA | Consecutive | 187 | 0.0110 | 0.0056 | 0.0056 | 0.0709 |
|  | Non-conseq. | 52 | 0.0109 | 0.0040 | 0.0062 | 0.0272 |
| GBR | Consecutive | 187 | 0.0090 | 0.0028 | 0.0055 | 0.0309 |
|  | Non-conseq. | 52 | 0.0086 | 0.0022 | 0.0058 | 0.0188 |
| HKG | Consecutive | 121 | 0.0090 | 0.0085 | 0.0012 | 0.0847 |
|  | Non-conseq. | 38 | 0.0081 | 0.0041 | 0.0031 | 0.0198 |
| ITA | Consecutive | 186 | 0.0089 | 0.0050 | 0.0026 | 0.0448 |
|  | Non-conseq. | 52 | 0.0094 | 0.0053 | 0.0045 | 0.0315 |
| JPN | Consecutive | 185 | 0.0130 | 0.0054 | 0.0077 | 0.0664 |
|  | Non-conseq. | 51 | 0.0134 | 0.0040 | 0.0087 | 0.0270 |
| SGP | Consecutive | 129 | 0.0085 | 0.0061 | 0.0000 | 0.0521 |
|  | Non-conseq. | 39 | 0.0071 | 0.0051 | 0.0021 | 0.0306 |

The average was taken across top 10% stocks by market cap.

TABLE 2.2 t-stats on the hypothesis that over-night volatilities for consecutive and non-consecutive trading days are equal

| Country | AUS | DEU | FRA | GBR | HKG | ITA | JPN | SGP |
|---|---|---|---|---|---|---|---|---|
| t-statistic | −1.0840 | −0.1858 | −0.1025 | −1.5449 | −0.8913 | 0.5898 | 0.5093 | −1.4816 |

Appendix 3 Model Selection: In-sample Testing

TABLE 3.1

$R^2$ values of Model 1a

| Country | AUS | DEU | FRA | GBR | HKG | ITA | JPN | SGP |
|---|---|---|---|---|---|---|---|---|
| Top 5 | 0.182 | 0.234 | 0.270 | 0.227 | 0.265 | 0.236 | 0.208 | 0.218 |
| Top 5% | 0.157 | 0.206 | 0.208 | 0.157 | 0.230 | 0.230 | 0.176 | 0.190 |
| Top 10% | 0.150 | 0.202 | 0.195 | 0.147 | 0.227 | 0.218 | 0.169 | 0.194 |
| Top 25% | 0.148 | 0.170 | 0.188 | 0.135 | 0.219 | 0.207 | 0.160 | 0.196 |
| Top 50% | 0.141 | 0.187 | 0.187 | 0.131 | 0.216 | 0.202 | 0.157 | 0.181 |

TABLE 3.2

$R^2$ values of Model 1b

| Country | AUS | DEU | FRA | GBR | HKG | ITA | JPN | SGP |
|---|---|---|---|---|---|---|---|---|
| Top 5 | 0.212 | 0.248 | 0.291 | 0.254 | 0.368 | 0.269 | 0.264 | 0.244 |
| Top 5% | 0.190 | 0.235 | 0.240 | 0.186 | 0.326 | 0.261 | 0.213 | 0.225 |
| Top 10% | 0.183 | 0.232 | 0.227 | 0.176 | 0.318 | 0.254 | 0.205 | 0.230 |
| Top 25% | 0.182 | 0.201 | 0.221 | 0.164 | 0.308 | 0.244 | 0.196 | 0.231 |
| Top 50% | 0.176 | 0.217 | 0.219 | 0.161 | 0.303 | 0.239 | 0.193 | 0.219 |

TABLE 3.3

$R^2$ values of Model 1c

| Country | AUS | DEU | FRA | GBR | HKG | ITA | JPN | SGP |
|---|---|---|---|---|---|---|---|---|
| Top 5 | 0.201 | 0.242 | 0.287 | 0.234 | 0.362 | 0.257 | 0.258 | 0.237 |
| Top 5% | 0.180 | 0.225 | 0.232 | 0.173 | 0.317 | 0.249 | 0.204 | 0.214 |
| Top 10% | 0.174 | 0.221 | 0.219 | 0.163 | 0.310 | 0.241 | 0.196 | 0.218 |
| Top 25% | 0.172 | 0.190 | 0.212 | 0.152 | 0.298 | 0.229 | 0.187 | 0.219 |
| Top 50% | 0.169 | 0.207 | 0.210 | 0.149 | 0.293 | 0.225 | 0.183 | 0.207 |

Appendix 4 Percentages of Significant Positive T-statistics in Model 4

| Country | Top 5 | Top 5% | Top 10% | Top 25% | Top 50% |
|---|---|---|---|---|---|
| AUS | 4% | 7% | 7% | 9% | 9% |
| DEU | 3% | 4% | 4% | 3% | 3% |
| FRA | 3% | 6% | 7% | 6% | 6% |
| GBR | 2% | 5% | 5% | 5% | 5% |
| HKG | 1% | 16% | 11% | 12% | 11% |
| ITA | 8% | 4% | 4% | 6% | 6% |
| JPN | 8% | 5% | 6% | 7% | 8% |
| SGP | 4% | 5% | 5% | 5% | 5% |

Appendix 5 Back-testing Statistics for Sector Selection

| Country | Model | MAE | HIT | COR |
|---|---|---|---|---|
| AUS | 5a | 0.00811 | 0.58045 | 0.24491 |
|  | 5b | 0.00980 | 0.56135 | 0.21495 |
|  | 5c | 0.00933 | 0.56726 | 0.21523 |
| DEU | 5a | 0.00894 | 0.57505 | 0.35751 |
|  | 5b | 0.00911 | 0.57318 | 0.34973 |
|  | 5c | 0.00906 | 0.57318 | 0.35044 |
| FRA | 5a | 0.00863 | 0.61076 | 0.38524 |
|  | 5b | 0.00879 | 0.60528 | 0.37601 |
|  | 5c | 0.0087 | 0.60748 | 0.38054 |
| GBR | 5a | 0.00791 | 0.5706 | 0.3035 |
|  | 5b | 0.0081 | 0.55771 | 0.27512 |
|  | 5c | 0.00802 | 0.56333 | 0.28606 |
| HKG | 5a | 0.00821 | 0.53427 | 0.48282 |
|  | 5b | 0.00842 | 0.50197 | 0.42804 |
|  | 5c | 0.00834 | 0.50163 | 0.45438 |
| ITA | 5a | 0.00717 | 0.65735 | 0.43698 |
|  | 5b | 0.00732 | 0.64411 | 0.3923 |
|  | 5c | 0.00721 | 0.64942 | 0.41669 |
| JPN | 5a | 0.01283 | 0.56176 | 0.31748 |
|  | 5b | 0.013 | 0.55242 | 0.31787 |
|  | 5c | 0.0129 | 0.55837 | 0.32994 |
| SGP | 5a | 0.00842 | 0.5002 | 0.38348 |
|  | 5b | 0.00858 | 0.47464 | 0.3363 |
|  | 5c | 0.00853 | 0.47714 | 0.34281 |

Appendix 6 Model Selection: Summary

TABLE 6.1

Back-testing Statistics for Model Selection

| Country | Model | MAE | HIT | COR |
|---|---|---|---|---|
| AUS | 1a | 0.00689 | 0.38419 | 0.23420 |
|  | 2 | 0.00685 | 0.57900 | 0.25680 |
|  | 3a | 0.00676 | 0.55182 | 0.29389 |
| DEU | 1a | 0.00924 | 0.21924 | 0.21648 |
|  | 2 | 0.00856 | 0.58025 | 0.35898 |
|  | 3a | 0.00866 | 0.51318 | 0.34475 |
| FRA | 1a | 0.00891 | 0.33451 | 0.27687 |
|  | 2 | 0.00859 | 0.60057 | 0.38984 |
|  | 3a | 0.00865 | 0.54468 | 0.36921 |
| GBR | 1a | 0.00801 | 0.31741 | 0.22521 |
|  | 2 | 0.00787 | 0.56281 | 0.29165 |
|  | 3a | 0.00778 | 0.51050 | 0.30350 |
| HKG | 1a | 0.00901 | 0.21209 | 0.21500 |
|  | 2 | 0.00810 | 0.52780 | 0.48177 |
|  | 3a | 0.00853 | 0.39942 | 0.33436 |
| ITA | 1a | 0.00740 | 0.45331 | 0.37068 |
|  | 2 | 0.00695 | 0.66864 | 0.46543 |
|  | 3a | 0.00710 | 0.60372 | 0.41537 |
| JPN | 1a | 0.01323 | 0.28534 | 0.20120 |
|  | 2 | 0.01260 | 0.56862 | 0.34364 |
|  | 3a | 0.01286 | 0.52440 | 0.30486 |
| SGP | 1a | 0.00861 | 0.22492 | 0.21045 |
|  | 2 | 0.00845 | 0.49521 | 0.38399 |
|  | 3a | 0.00845 | 0.46968 | 0.36077 |

TABLE 6.2

Arbitrage Profit Statistics of Model 2

| Country | No Model | | Model 2 | |
|---|---|---|---|---|
|  | ARB | ARBBIG | ARB | ARBBIG |
| AUS | 0.00515 | 0.00880 | −0.00008 | 0.00112 |
| DEU | 0.00805 | 0.01332 | 0.00165 | 0.00247 |
| FRA | 0.00817 | 0.01413 | 0.00065 | 0.00186 |
| GBR | 0.00593 | 0.00937 | 0.00062 | 0.00082 |
| HKG | 0.00883 | 0.01728 | −0.00072 | 0.00274 |
| ITA | 0.00800 | 0.01320 | 0.00113 | 0.00219 |
| JPN | 0.01107 | 0.01812 | 0.00022 | 0.00244 |
| SGP | 0.00901 | 0.01459 | 0.00187 | 0.00400 |

Appendix 7 Model Selection: Details By Country and Universe Segment

TABLE 7.1

AUS

| Model | Universe | ARB | ARBBIG | MAE | HIT | COR |
|---|---|---|---|---|---|---|
| No Model | Largest 10 | 0.00669 | 0.01149 | 0.00801 | 0 | 0 |
| | Top 5% | 0.00538 | 0.00919 | 0.00721 | 0 | 0 |
| | Top 10% | 0.00515 | 0.0088 | 0.00719 | 0 | 0 |
| | Top 25% | 0.00498 | 0.00855 | 0.00738 | 0 | 0 |
| | Top 50% | 0.0049 | 0.00843 | 0.00757 | 0 | 0 |
| 1a | Largest 10 | 0.00114 | 0.00339 | 0.00739 | 0.53612 | 0.34601 |
| | Top 5% | 0.00146 | 0.00346 | 0.00687 | 0.40611 | 0.24917 |
| | Top 10% | 0.00144 | 0.00337 | 0.00689 | 0.38419 | 0.2342 |
| | Top 25% | 0.00139 | 0.0033 | 0.00711 | 0.36607 | 0.22169 |
| | Top 50% | 0.00137 | 0.00328 | 0.00731 | 0.35978 | 0.21758 |
| 2 | Largest 10 | −0.0001 | 0.00151 | 0.00732 | 0.63953 | 0.32685 |
| | Top 5% | −0.00012 | 0.00111 | 0.00682 | 0.59624 | 0.27003 |
| | Top 10% | −0.00008 | 0.00112 | 0.00685 | 0.579 | 0.2568 |
| | Top 25% | −0.00013 | 0.00105 | 0.00708 | 0.56115 | 0.2449 |
| | Top 50% | −0.00014 | 0.00103 | 0.00729 | 0.55336 | 0.24053 |
| 3a | Largest 10 | 0.00077 | 0.00289 | 0.00712 | 0.66204 | 0.40646 |
| | Top 5% | 0.00082 | 0.00255 | 0.00671 | 0.57655 | 0.311 |
| | Top 10% | 0.0008 | 0.00247 | 0.00676 | 0.55182 | 0.29389 |
| | Top 25% | 0.00075 | 0.0024 | 0.00699 | 0.52932 | 0.27906 |
| | Top 50% | 0.00073 | 0.00236 | 0.0072 | 0.52096 | 0.27412 |

TABLE 7.2

DEU

| Model | Universe | ARB | ARBBIG | MAE | HIT | COR |
|---|---|---|---|---|---|---|
| No Model | Largest 10 | 0.00884 | 0.01431 | 0.00804 | 0 | 0 |
| | Top 5% | 0.00881 | 0.01455 | 0.00949 | 0 | 0 |
| | Top 10% | 0.00805 | 0.01332 | 0.00964 | 0 | 0 |
| | Top 25% | 0.00749 | 0.01246 | 0.00999 | 0 | 0 |
| | Top 50% | 0.00733 | 0.01211 | 0.01014 | 0 | 0 |
| 1a | Largest 10 | 0.00611 | 0.00986 | 0.00753 | 0.22468 | 0.28639 |
| | Top 5% | 0.00603 | 0.00997 | 0.00903 | 0.23224 | 0.23833 |
| | Top 10% | 0.00546 | 0.00905 | 0.00924 | 0.21924 | 0.21648 |
| | Top 25% | 0.00511 | 0.00852 | 0.00963 | 0.20612 | 0.19609 |
| | Top 50% | 0.00501 | 0.00828 | 0.0098 | 0.20068 | 0.19008 |
| 2 | Largest 10 | 0.00177 | 0.00237 | 0.00678 | 0.64455 | 0.45709 |
| | Top 5% | 0.00179 | 0.00264 | 0.00826 | 0.60729 | 0.39565 |
| | Top 10% | 0.00165 | 0.00247 | 0.00856 | 0.58025 | 0.35898 |
| | Top 25% | 0.00169 | 0.00262 | 0.00906 | 0.54877 | 0.32677 |
| | Top 50% | 0.00168 | 0.00253 | 0.00925 | 0.53764 | 0.31674 |
| 3a | Largest 10 | 0.00286 | 0.00419 | 0.0069 | 0.56199 | 0.44297 |
| | Top 5% | 0.00296 | 0.0046 | 0.00838 | 0.54314 | 0.37943 |
| | Top 10% | 0.00267 | 0.00416 | 0.00866 | 0.51318 | 0.34475 |
| | Top 25% | 0.00262 | 0.00418 | 0.00915 | 0.47773 | 0.31309 |
| | Top 50% | 0.00259 | 0.00406 | 0.00933 | 0.46559 | 0.30331 |

TABLE 7.3

FRA

| Model | Universe | ARB | ARBBIG | MAE | HIT | COR |
|---|---|---|---|---|---|---|
| No Model | Largest 10 | 0.00749 | 0.01355 | 0.0086 | 0 | 0 |
| | Top 5% | 0.00848 | 0.01478 | 0.0095 | 0 | 0 |
| | Top 10% | 0.00817 | 0.01413 | 0.00974 | 0 | 0 |
| | Top 25% | 0.00799 | 0.01375 | 0.00998 | 0 | 0 |
| | Top 50% | 0.00791 | 0.0136 | 0.01013 | 0 | 0 |
| 1a | Largest 10 | 0.00282 | 0.00568 | 0.00775 | 0.40181 | 0.34948 |
| | Top 5% | 0.00344 | 0.00648 | 0.00858 | 0.36276 | 0.30223 |
| | Top 10% | 0.00347 | 0.00641 | 0.00891 | 0.33451 | 0.27687 |
| | Top 25% | 0.0035 | 0.00636 | 0.00921 | 0.31943 | 0.26148 |
| | Top 50% | 0.00348 | 0.00632 | 0.00937 | 0.31441 | 0.25647 |

TABLE 7.3-continued

FRA

| Model | Universe | ARB | ARBBIG | MAE | HIT | COR |
|---|---|---|---|---|---|---|
| 2 | Largest 10 | 0.00044 | 0.00207 | 0.00738 | 0.62345 | 0.43757 |
| | Top 5% | 0.00064 | 0.00199 | 0.00823 | 0.61696 | 0.41724 |
| | Top 10% | 0.00065 | 0.00186 | 0.00859 | 0.60057 | 0.38984 |
| | Top 25% | 0.00069 | 0.00184 | 0.00889 | 0.58716 | 0.37071 |
| | Top 50% | 0.00069 | 0.00182 | 0.00906 | 0.58155 | 0.36392 |
| 3a | Largest 10 | 0.00172 | 0.004 | 0.00743 | 0.63417 | 0.44633 |
| | Top 5% | 0.00217 | 0.00447 | 0.0083 | 0.5684 | 0.39612 |
| | Top 10% | 0.00211 | 0.00425 | 0.00865 | 0.54468 | 0.36921 |
| | Top 25% | 0.0021 | 0.00414 | 0.00895 | 0.52581 | 0.35209 |
| | Top 50% | 0.00208 | 0.00408 | 0.00912 | 0.51896 | 0.34583 |

TABLE 7.4

GBR

| Model | Universe | ARB | ARBBIG | MAE | HIT | COR |
|---|---|---|---|---|---|---|
| No Model | Largest 10 | 0.00691 | 0.01136 | 0.00716 | 0 | 0 |
| | Top 5% | 0.00631 | 0.00992 | 0.00818 | 0 | 0 |
| | Top 10% | 0.00593 | 0.00937 | 0.00831 | 0 | 0 |
| | Top 25% | 0.00566 | 0.00897 | 0.00833 | 0 | 0 |
| | Top 50% | 0.00555 | 0.00881 | 0.00838 | 0 | 0 |
| 1a | Largest 10 | 0.00234 | 0.00377 | 0.00656 | 0.45133 | 0.37389 |
| | Top 5% | 0.00264 | 0.00391 | 0.00785 | 0.33936 | 0.24468 |
| | Top 10% | 0.00255 | 0.00384 | 0.00801 | 0.31741 | 0.22521 |
| | Top 25% | 0.00248 | 0.00377 | 0.00807 | 0.30345 | 0.21218 |
| | Top 50% | 0.00245 | 0.00373 | 0.00813 | 0.29653 | 0.2067 |
| 2 | Largest 10 | 0.00045 | 0.00093 | 0.00637 | 0.62128 | 0.4187 |
| | Top 5% | 0.00067 | 0.00084 | 0.00769 | 0.57424 | 0.31393 |
| | Top 10% | 0.00062 | 0.00082 | 0.00787 | 0.56281 | 0.29165 |
| | Top 25% | 0.00059 | 0.00081 | 0.00793 | 0.55195 | 0.2765 |
| | Top 50% | 0.00058 | 0.00082 | 0.008 | 0.54409 | 0.26973 |
| 3a | Largest 10 | 0.00143 | 0.0023 | 0.00625 | 0.64191 | 0.45641 |
| | Top 5% | 0.00149 | 0.00206 | 0.0076 | 0.53333 | 0.32615 |
| | Top 10% | 0.00139 | 0.00198 | 0.00778 | 0.5105 | 0.3035 |
| | Top 25% | 0.00133 | 0.00192 | 0.00784 | 0.49243 | 0.28852 |
| | Top 50% | 0.00132 | 0.00192 | 0.00791 | 0.48295 | 0.28161 |

TABLE 7.5

HKG

| Model | Universe | ARB | ARBBIG | MAE | HIT | COR |
|---|---|---|---|---|---|---|
| No Model | Largest 10 | 0.01004 | 0.01881 | 0.00877 | 0 | 0 |
| | Top 5% | 0.00936 | 0.01748 | 0.00888 | 0 | 0 |
| | Top 10% | 0.00883 | 0.01728 | 0.00922 | 0 | 0 |
| | Top 25% | 0.00864 | 0.01691 | 0.0095 | 0 | 0 |
| | Top 50% | 0.00853 | 0.01671 | 0.00984 | 0 | 0 |
| 1a | Largest 10 | 0.00617 | 0.01302 | 0.00843 | 0.24006 | 0.27187 |
| | Top 5% | 0.00607 | 0.01251 | 0.00864 | 0.21252 | 0.21973 |
| | Top 10% | 0.00542 | 0.01211 | 0.00901 | 0.21209 | 0.215 |
| | Top 25% | 0.00531 | 0.01187 | 0.00931 | 0.20403 | 0.20461 |
| | Top 50% | 0.00524 | 0.01172 | 0.00967 | 0.1991 | 0.19836 |
| 2 | Largest 10 | −0.00068 | 0.00251 | 0.00723 | 0.58287 | 0.55452 |
| | Top 5% | −0.00036 | 0.0027 | 0.00766 | 0.53947 | 0.4973 |
| | Top 10% | −0.00072 | 0.00274 | 0.0081 | 0.5278 | 0.48177 |
| | Top 25% | −0.0007 | 0.00269 | 0.00847 | 0.51083 | 0.46141 |
| | Top 50% | −0.00068 | 0.00268 | 0.00885 | 0.49973 | 0.44866 |
| 3a | Largest 10 | 0.00343 | 0.00891 | 0.00772 | 0.4486 | 0.40204 |
| | Top 5% | 0.00358 | 0.00874 | 0.00811 | 0.40311 | 0.33979 |
| | Top 10% | 0.00309 | 0.00855 | 0.00853 | 0.39942 | 0.33436 |
| | Top 25% | 0.00302 | 0.00835 | 0.00886 | 0.38704 | 0.32143 |
| | Top 50% | 0.00297 | 0.00823 | 0.00924 | 0.37852 | 0.31254 |

TABLE 7.6

ITA

| Model | Universe | ARB | ARBBIG | MAE | HIT | COR |
|---|---|---|---|---|---|---|
| No Model | Largest 10 | 0.0077 | 0.01288 | 0.00742 | 0 | 0 |
| | Top 5% | 0.00785 | 0.01316 | 0.00781 | 0 | 0 |
| | Top 10% | 0.008 | 0.0132 | 0.00813 | 0 | 0 |
| | Top 25% | 0.00752 | 0.01243 | 0.00811 | 0 | 0 |
| | Top 50% | 0.00738 | 0.01218 | 0.00823 | 0 | 0 |
| 1a | Largest 10 | 0.00375 | 0.00671 | 0.0066 | 0.49902 | 0.42169 |
| | Top 5% | 0.00364 | 0.00661 | 0.00702 | 0.48206 | 0.40443 |
| | Top 10% | 0.00374 | 0.00661 | 0.0074 | 0.45331 | 0.37068 |
| | Top 25% | 0.00352 | 0.00625 | 0.00746 | 0.42347 | 0.33929 |
| | Top 50% | 0.00351 | 0.00619 | 0.00761 | 0.40986 | 0.32483 |
| 2 | Largest 10 | 0.00105 | 0.0022 | 0.00622 | 0.68189 | 0.49282 |
| | Top 5% | 0.00103 | 0.00222 | 0.0066 | 0.67604 | 0.4814 |
| | Top 10% | 0.00113 | 0.00219 | 0.00695 | 0.66864 | 0.46543 |
| | Top 25% | 0.00107 | 0.0021 | 0.00705 | 0.64978 | 0.42952 |
| | Top 50% | 0.00104 | 0.00203 | 0.00721 | 0.64241 | 0.41556 |
| 3a | Largest 10 | 0.00247 | 0.00451 | 0.00635 | 0.64194 | 0.44196 |
| | Top 5% | 0.00238 | 0.00441 | 0.00672 | 0.63101 | 0.43714 |
| | Top 10% | 0.00258 | 0.00456 | 0.0071 | 0.60372 | 0.41537 |
| | Top 25% | 0.00249 | 0.00442 | 0.0072 | 0.57543 | 0.38166 |
| | Top 50% | 0.00242 | 0.00429 | 0.00736 | 0.56619 | 0.3689 |

TABLE 7.7

JPN

| Model | Universe | ARB | ARBBIG | MAE | HIT | COR |
|---|---|---|---|---|---|---|
| No Model | Largest 10 | 0.01315 | 0.0219 | 0.01461 | 0 | 0 |
| | Top 5% | 0.01151 | 0.01884 | 0.0139 | 0 | 0 |
| | Top 10% | 0.01107 | 0.01812 | 0.01371 | 0 | 0 |
| | Top 25% | 0.01053 | 0.01728 | 0.0135 | 0 | 0 |
| | Top 50% | 0.01026 | 0.01687 | 0.01346 | 0 | 0 |
| 1a | Largest 10 | 0.00705 | 0.013 | 0.01412 | 0.32809 | 0.21275 |
| | Top 5% | 0.00556 | 0.01025 | 0.01336 | 0.2957 | 0.2097 |
| | Top 10% | 0.00537 | 0.0099 | 0.01323 | 0.28534 | 0.2012 |
| | Top 25% | 0.00511 | 0.00947 | 0.01309 | 0.27421 | 0.19042 |
| | Top 50% | 0.00501 | 0.00929 | 0.01307 | 0.26633 | 0.18405 |
| 2 | Largest 10 | 0.00069 | 0.00394 | 0.01302 | 0.5941 | 0.402 |
| | Top 5% | 0.0003 | 0.00263 | 0.01268 | 0.57613 | 0.3562 |
| | Top 10% | 0.00022 | 0.00244 | 0.0126 | 0.56862 | 0.34364 |
| | Top 25% | 0.00016 | 0.00229 | 0.01251 | 0.55762 | 0.3286 |
| | Top 50% | 0.00016 | 0.00226 | 0.01252 | 0.54821 | 0.31928 |
| 3a | Largest 10 | 0.00318 | 0.00735 | 0.01342 | 0.59127 | 0.37146 |
| | Top 5% | 0.00273 | 0.00606 | 0.01297 | 0.53681 | 0.31599 |
| | Top 10% | 0.00259 | 0.00578 | 0.01286 | 0.5244 | 0.30486 |
| | Top 25% | 0.00242 | 0.00548 | 0.01276 | 0.50813 | 0.29152 |
| | Top 50% | 0.00236 | 0.00538 | 0.01275 | 0.4964 | 0.283 |

TABLE 7.8

SGP

| Model | Universe | ARB | ARBBIG | MAE | HIT | COR |
|---|---|---|---|---|---|---|
| No Model | Largest 10 | 0.0097 | 0.01594 | 0.0088 | 0 | 0 |
| | Top 5% | 0.0095 | 0.01531 | 0.00901 | 0 | 0 |
| | Top 10% | 0.00901 | 0.01459 | 0.00905 | 0 | 0 |
| | Top 25% | 0.00874 | 0.01433 | 0.00949 | 0 | 0 |
| | Top 50% | 0.00872 | 0.0144 | 0.01003 | 0 | 0 |
| 1a | Largest 10 | 0.00625 | 0.01078 | 0.00829 | 0.23065 | 0.23009 |
| | Top 5% | 0.0057 | 0.0096 | 0.00849 | 0.23904 | 0.23037 |
| | Top 10% | 0.00543 | 0.0092 | 0.00861 | 0.22492 | 0.21045 |
| | Top 25% | 0.0053 | 0.00915 | 0.0091 | 0.21393 | 0.19466 |
| | Top 50% | 0.00531 | 0.00927 | 0.00966 | 0.20777 | 0.18836 |
| 2 | Largest 10 | 0.00227 | 0.00497 | 0.00813 | 0.52465 | 0.45103 |
| | Top 5% | 0.00198 | 0.00414 | 0.00835 | 0.51613 | 0.42137 |
| | Top 10% | 0.00187 | 0.004 | 0.00845 | 0.49521 | 0.38399 |
| | Top 25% | 0.00184 | 0.00408 | 0.00897 | 0.47021 | 0.34861 |
| | Top 50% | 0.00189 | 0.00424 | 0.00955 | 0.45434 | 0.33638 |
| 3a | Largest 10 | 0.00346 | 0.00656 | 0.00807 | 0.534 | 0.43719 |
| | Top 5% | 0.00338 | 0.00606 | 0.00832 | 0.4986 | 0.39822 |
| | Top 10% | 0.00324 | 0.00592 | 0.00845 | 0.46968 | 0.36077 |
| | Top 25% | 0.00318 | 0.00596 | 0.00899 | 0.43997 | 0.3284 |
| | Top 50% | 0.00323 | 0.00614 | 0.00957 | 0.42434 | 0.31679 |

Appendix 8 Testing Naive Model

TABLE 8.1

AUS

| Model | Universe | ARB | ARBBIG | MAE | MAEBIG | HIT | COR |
|---|---|---|---|---|---|---|---|
| No Model | Largest 10 | 0.00342 | 0.00519 | 0.006 | 0.00668 | | |
| | Top 5% | 0.00248 | 0.00353 | 0.00511 | 0.00555 | | |
| | Top 10% | 0.00256 | 0.0034 | 0.00486 | 0.00524 | | |
| | Top 25% | 0.00231 | 0.00284 | 0.00501 | 0.0053 | | |
| 2 | Largest 10 | 0.00002 | 0.00061 | 0.00533 | 0.00552 | 0.69341 | 0.45846 |
| | Top 5% | 0.00017 | 0.00043 | 0.00488 | 0.00509 | 0.63251 | 0.33034 |
| | Top 10% | 0.00058 | 0.00073 | 0.00478 | 0.00504 | 0.61803 | 0.27761 |
| | Top 25% | 0.0009 | 0.00092 | 0.00508 | 0.00536 | 0.57594 | 0.16233 |
| 2' | Largest 10 | −0.00423 | −0.00518 | 0.00766 | 0.00896 | 0.69376 | 0.4667 |
| | Top 5% | −0.00517 | −0.00683 | 0.00789 | 0.00951 | 0.63512 | 0.34349 |
| | Top 10% | −0.0051 | −0.00697 | 0.00798 | 0.00976 | 0.62051 | 0.29814 |
| | Top 25% | −0.00536 | −0.00758 | 0.0086 | 0.01054 | 0.5848 | 0.19984 |

TABLE 8.2

DEU

| Model | Universe | ARB | ARBBIG | MAE | MAEBIG | HIT | COR |
|---|---|---|---|---|---|---|---|
| No Model | Largest 10 | 0.00276 | 0.00482 | 0.00805 | 0.00922 | | |
| | Top 5% | 0.00303 | 0.0049 | 0.00744 | 0.00843 | | |
| | Top 10% | 0.00303 | 0.0045 | 0.00786 | 0.00862 | | |
| | Top 25% | 0.00068 | 0.00162 | 0.00802 | 0.00844 | | |

TABLE 8.2-continued

DEU

| Model | Universe | ARB | ARBBIG | MAE | MAEBIG | HIT | COR |
|---|---|---|---|---|---|---|---|
| 2 | Largest 10 | −0.00145 | −0.00139 | 0.00673 | 0.00706 | 0.67642 | 0.44973 |
|  | Top 5% | −0.00145 | −0.00156 | 0.00685 | 0.00712 | 0.66986 | 0.43356 |
|  | Top 10% | −0.0006 | −0.00085 | 0.00689 | 0.00709 | 0.63771 | 0.34808 |
|  | Top 25% | −0.00133 | −0.00133 | 0.00767 | 0.00786 | 0.5876 | 0.2027 |
| 2' | Largest 10 | −0.00302 | −0.00368 | 0.00722 | 0.00783 | 0.68187 | 0.49354 |
|  | Top 5% | −0.00328 | −0.00424 | 0.00738 | 0.00797 | 0.67366 | 0.47319 |
|  | Top 10% | −0.00288 | −0.00419 | 0.00767 | 0.00833 | 0.64677 | 0.39363 |
|  | Top 25% | −0.00507 | −0.00684 | 0.00891 | 0.00987 | 0.59081 | 0.23571 |

TABLE 8.3

FRA

| Model | Universe | ARB | ARBBIG | MAE | MAEBIG | HIT | COR |
|---|---|---|---|---|---|---|---|
| No Model | Largest 10 | 0.00363 | 0.00478 | 0.00674 | 0.00726 |  |  |
|  | Top 5% | 0.00358 | 0.00513 | 0.00754 | 0.00824 |  |  |
|  | Top 10% | 0.00225 | 0.00353 | 0.0084 | 0.00895 |  |  |
|  | Top 25% | 0.00169 | 0.00266 | 0.00865 | 0.00909 |  |  |
| 2 | Largest 10 | 0.00063 | 0.0006 | 0.006 | 0.00605 | 0.67137 | 0.43319 |
|  | Top 5% | −0.00026 | −0.00018 | 0.0067 | 0.00683 | 0.65642 | 0.41516 |
|  | Top 10% | −0.00110 | −0.00111 | 0.00792 | 0.00812 | 0.61452 | 0.29315 |
|  | Top 25% | −0.00082 | −0.00082 | 0.00848 | 0.00875 | 0.56744 | 0.1588 |
| 2' | Largest 10 | −0.00202 | −0.00311 | 0.00665 | 0.00706 | 0.67111 | 0.44876 |
|  | Top 5% | −0.00214 | −0.0028 | 0.00737 | 0.00788 | 0.65817 | 0.43423 |
|  | Top 10% | −0.00352 | −0.00449 | 0.0088 | 0.00947 | 0.615 | 0.31833 |
|  | Top 25% | −0.00400 | −0.00527 | 0.00983 | 0.01082 | 0.57752 | 0.19815 |

Appendix 9 Testing ETFs

TABLE 9.1

AUS

| Model | Universe | ARB | ARBBIG | MAE | MAEBIG | HIT | COR |
|---|---|---|---|---|---|---|---|
| No Model | Largest 10 | 0.00342 | 0.00521 | 0.00602 | 0.00671 |  |  |
|  | Top 5% | 0.00259 | 0.00367 | 0.00514 | 0.00558 |  |  |
|  | Top 10% | 0.00256 | 0.00342 | 0.00488 | 0.00526 |  |  |
|  | Top 25% | 0.00236 | 0.00284 | 0.00506 | 0.00533 |  |  |
| 2 | Largest 10 | 0.00002 | 0.00063 | 0.00534 | 0.00553 | 0.69472 | 0.46086 |
|  | Top 5% | 0.00016 | 0.00043 | 0.00489 | 0.0051 | 0.63354 | 0.3325 |
|  | Top 10% | 0.00058 | 0.00074 | 0.00479 | 0.00505 | 0.61894 | 0.27897 |
|  | Top 25% | 0.00092 | 0.0009 | 0.00513 | 0.00539 | 0.57762 | 0.16286 |
| 2" | Largest 10 | 0.00326 | 0.00539 | 0.00628 | 0.00685 | 0.53509 | 0.09757 |
|  | Top 5% | 0.00259 | 0.004 | 0.0056 | 0.00597 | 0.52686 | 0.0832 |
|  | Top 10% | 0.00266 | 0.00376 | 0.00514 | 0.00547 | 0.52276 | 0.0515 |
|  | Top 25% | 0.0025 | 0.00315 | 0.00518 | 0.0054 | 0.51313 | 0.01582 |
| 2''' | Largest 10 | −0.00011 | 0.00085 | 0.00555 | 0.00567 | 0.67927 | 0.43497 |
|  | Top 5% | 0.00011 | 0.00063 | 0.0051 | 0.00525 | 0.63612 | 0.32335 |
|  | Top 10% | 0.00055 | 0.00096 | 0.00489 | 0.00512 | 0.62179 | 0.27292 |
|  | Top 25% | 0.00095 | 0.00112 | 0.00509 | 0.00531 | 0.58096 | 0.16344 |

TABLE 9.2

DEU

| Model | Universe | ARB | ARBBIG | MAE | MAEBIG | HIT | COR |
|---|---|---|---|---|---|---|---|
| No Model | Largest 10 | 0.00275 | 0.00482 | 0.0081 |  |  |  |
|  | Top 5% | 0.00289 | 0.00486 | 0.00778 |  |  |  |
|  | Top 10% | 0.00317 | 0.00486 | 0.00813 |  |  |  |
|  | Top 25% | 0.00101 | 0.00205 | 0.00811 |  |  |  |
| 2 | Largest 10 | −0.0015 | −0.0015 | 0.00677 | 0.00712 | 0.67709 | 0.45018 |
|  | Top 5% | −0.0014 | −0.0014 | 0.00652 | 0.00686 | 0.67915 | 0.46444 |
|  | Top 10% | −0.0007 | −0.001 | 0.00713 | 0.00738 | 0.66037 | 0.39675 |
|  | Top 25% | −0.0012 | −0.0012 | 0.00767 | 0.00791 | 0.59603 | 0.22961 |

TABLE 9.2-continued

DEU

| Model | Universe | ARB | ARBBIG | MAE | MAEBIG | HIT | COR |
|---|---|---|---|---|---|---|---|
| 2" | Largest 10 | 0.00126 | 0.00235 | 0.0082 | 0.0094 | 0.5854 | 0.1769 |
| | Top 5% | 0.00144 | 0.00241 | 0.00789 | 0.00902 | 0.59559 | 0.17533 |
| | Top 10% | 0.00185 | 0.00263 | 0.00834 | 0.00919 | 0.57656 | 0.15029 |
| | Top 25% | 0.00062 | 0.00111 | 0.00833 | 0.00883 | 0.53509 | 0.08099 |
| 2''' | Largest 10 | −0.0017 | −0.0018 | 0.00697 | 0.00744 | 0.67744 | 0.41033 |
| | Top 5% | −0.0013 | −0.0016 | 0.0066 | 0.00702 | 0.68793 | 0.43348 |
| | Top 10% | −0.0007 | −0.0012 | 0.00739 | 0.00774 | 0.65308 | 0.35298 |
| | Top 25% | −0.0013 | −0.0015 | 0.00782 | 0.00808 | 0.58303 | 0.19593 |

TABLE 9.3

FRA

| Model | Universe | ARB | ARBBIG | MAE | MAEBIG | HIT | COR |
|---|---|---|---|---|---|---|---|
| No Model | Largest 10 | 0.00362 | 0.00478 | 0.00678 | 0.0073 | | |
| | Top 5% | 0.00361 | 0.00521 | 0.00779 | 0.00861 | | |
| | Top 10% | 0.00225 | 0.00355 | 0.00844 | 0.00901 | | |
| | Top 25% | 0.00181 | 0.00279 | 0.00861 | 0.00906 | | |
| 2 | Largest 10 | 0.00059 | 0.00056 | 0.00603 | 0.00608 | 0.67073 | 0.43278 |
| | Top 5% | −0.00046 | −0.00043 | 0.0069 | 0.0071 | 0.65818 | 0.42001 |
| | Top 10% | −0.00113 | −0.00116 | 0.00797 | 0.00817 | 0.61424 | 0.29396 |
| | Top 25% | −0.00073 | −0.00076 | 0.0084 | 0.00869 | 0.57018 | 0.16766 |
| 2" | Largest 10 | 0.00289 | 0.00396 | 0.00699 | 0.00752 | 0.57545 | 0.09361 |
| | Top 5% | 0.00259 | 0.00399 | 0.00803 | 0.00876 | 0.56614 | 0.09608 |
| | Top 10% | 0.00143 | 0.00247 | 0.00891 | 0.00947 | 0.54977 | 0.06079 |
| | Top 25% | 0.00121 | 0.00201 | 0.00921 | 0.00967 | 0.538 | 0.03295 |
| 2''' | Largest 10 | 0.0005 | 0.00043 | 0.00603 | 0.00611 | 0.67773 | 0.43952 |
| | Top 5% | −0.00035 | −0.00034 | 0.00686 | 0.00706 | 0.65839 | 0.42125 |
| | Top 10% | −0.00115 | −0.00127 | 0.00804 | 0.00826 | 0.61884 | 0.3066 |
| | Top 25% | −0.00084 | −0.00095 | 0.00868 | 0.00895 | 0.57626 | 0.18432 |

Appendix 10 Testing ADRs

| Ticker | Company | Model | ARB | MAE | COR | HIT |
|---|---|---|---|---|---|---|
| BP | BP PLC | No model | 0.0087 | 0.0104 | | |
| | | 2 | −0.0007 | 0.0058 | 0.86792 | 0.8296 |
| | | ADR | −0.0009 | 0.0062 | 0.8679 | 0.8666 |
| VOD | VODAFONE GROUP PLC | No model | 0.0139 | 0.017 | | |
| | | 2 | −0.0018 | 0.0106 | 0.86538 | 0.7809 |
| | | ADR | −0.0004 | 0.0093 | 0.8301 | 0.8654 |
| GSK | GLAXOSMITHKLINE PLC | No model | 0.0084 | 0.0107 | | |
| | | 2 | 0.0015 | 0.0069 | 0.8 | 0.7582 |
| | | ADR | −0.0009 | 0.0062 | 0.8909 | 0.8448 |
| AZN | ASTRAZENECA PLC | No model | 0.0088 | 0.0125 | | |
| | | 2 | −0.0003 | 0.009 | 0.81034 | 0.6846 |
| | | ADR | 0 | 0.0093 | 0.8275 | 0.7589 |
| SHEL | SHELL TRANSPRT&TRADNG CO PLC | No model | 0.01 | 0.0115 | | |
| | | 2 | 0.0001 | 0.0063 | 0.85185 | 0.8223 |
| | | ADR | 0.0002 | 0.0072 | 0.8518 | 0.7821 |
| ULVR | UNILEVER PLC | No model | 0.0073 | 0.0087 | | |
| | | 2 | 0.0023 | 0.007 | 0.81132 | 0.5979 |
| | | ADR | −0.0002 | 0.0075 | 0.7777 | 0.5949 |

Appendix 11 When FVM Adjustment Factors Should be Applied?

TABLE 11.1

FTSE 100 (model 2), threshold on adjustment factors.

| Threshold | ARB | MAE | HIT | COR |
|---|---|---|---|---|
| Equally weighted | | | | |
| 0.000: | 0.00023 | 0.01008 | 0.55337 | 0.43362 |
| 0.005: | 0.00125 | 0.01006 | 0.69370 | 0.42218 |
| 0.010: | 0.00242 | 0.01030 | 0.79698 | 0.36476 |
| 0.015: | 0.00321 | 0.01054 | 0.88848 | 0.30374 |
| 0.020: | 0.00367 | 0.01073 | 0.89762 | 0.24505 |
| 0.025: | 0.00391 | 0.01080 | 0.89065 | 0.20415 |
| 0.030: | 0.00410 | 0.01091 | 0.83730 | 0.14949 |
| Market Cap weighted | | | | |
| 0.000: | 0.00005 | 0.00805 | 0.55337 | 0.43362 |
| 0.005: | 0.00111 | 0.00813 | 0.69370 | 0.42218 |
| 0.010: | 0.00250 | 0.00862 | 0.79698 | 0.36476 |
| 0.015: | 0.00354 | 0.00901 | 0.88848 | 0.30374 |
| 0.020: | 0.00425 | 0.00948 | 0.89762 | 0.24505 |
| 0.025: | 0.00457 | 0.00960 | 0.89065 | 0.20415 |
| 0.030: | 0.00497 | 0.00988 | 0.83730 | 0.14949 |

TABLE 11.2

FTSE 100 (model 2), threshold on US intraday market returns.

| Threshold | ARB | MAE | HIT | COR |
|---|---|---|---|---|
| Equally weighted | | | | |
| 0.000: | 0.00023 | 0.01008 | 0.61079 | 0.43363 |
| 0.005: | 0.00043 | 0.01003 | 0.67367 | 0.43691 |
| 0.010: | 0.00129 | 0.01001 | 0.76792 | 0.42961 |
| 0.015: | 0.00167 | 0.01014 | 0.78081 | 0.40947 |
| 0.020: | 0.00245 | 0.01022 | 0.82057 | 0.39039 |
| 0.025: | 0.00358 | 0.01067 | 0.85583 | 0.25457 |
| 0.030: | 0.00376 | 0.01074 | 0.83667 | 0.22756 |
| Market Cap weighted | | | | |
| 0.000: | 0.00002 | 0.00805 | 0.68386 | 0.43363 |
| 0.005: | 0.00029 | 0.00800 | 0.76936 | 0.43691 |
| 0.010: | 0.00146 | 0.00814 | 0.85744 | 0.42961 |
| 0.015: | 0.00197 | 0.00842 | 0.86856 | 0.40947 |
| 0.020: | 0.00296 | 0.00868 | 0.90969 | 0.39039 |
| 0.025: | 0.00444 | 0.00956 | 0.92642 | 0.25457 |
| 0.030: | 0.00466 | 0.00966 | 0.91461 | 0.22756 |

TABLE 11.3

FTSE 100 (no model).

| ARB | MAE |
|---|---|
| Equally weighted | |
| 0.00435 | 0.01098 |
| Mcap weighted | |
| 0.00542 | 0.0101 |

The invention having been thus described, it will be apparent to those skilled in the art that the same may be varied in many ways without departing from the spirit of the invention. Any and all such modifications are intended to be encompassed within the scope of the following claims.

What is claimed is:

1. A method for determining fair value prices of financial securities of international markets, comprising the steps of:
   selecting a universe of securities of a particular international market;
   computing overnight returns of each security in the selected universe over a predetermined past period of time;
   determining out-of-sample or back-testing performance of a plurality of return factors;
   selecting at least one return factor of a domestic financial market from the plurality of return factors, based on at least the determined out-of-sample or back-testing performance;
   computing, for each selected return factor, the return factor's daily return over said predetermined past period of time;
   calculating, for each selected return factor, a return factor coefficient for each security in the selected universe by performing a time series regression to obtain the contribution of each return factor's return to the security's overnight return; and
   storing each calculated return factor coefficient in a data file;
   wherein the stored return factor coefficients can be used in conjunction with current return factor daily return values to predict current overnight returns for all securities in the selected universe of securities, which predicted current overnight returns can be used in conjunction with closing prices on said particular international market of each security of said selected universe to determine a fair value price of each security of said selected universe.

2. The method of claim 1, wherein the step of selecting the universe of securities comprises the step of selecting securities from the group of substantially all relatively active securities in a selected international market.

3. The method of claim 1, wherein the step of computing overnight returns uses historical price data to compute overnight returns of each said security over said predetermined past period of time.

4. The method of claim 1, wherein said plurality of return factors includes domestic market return, domestic sector return, exchange traded fund (ETF) return for said selected international market, and American Depositary Receipt (ADR) return for each security in said selected universe.

5. The method of claim 1, wherein the step of selecting at least one return factor comprises the step of selecting at least two return factors.

6. The method of claim 1, wherein the step of calculating a return factor coefficient includes the step of adding a security price fluctuation factor into said time series regression.

7. The method of claim 6, wherein the step of calculating a return factor coefficient comprises solving the equation:

$$r_i = \beta^m m + \beta^s s_j + \epsilon.$$

8. The method of claim 6, wherein the step of calculating a return factor coefficient comprises solving the equation:

$$r_i = \beta^m m + \epsilon.$$

9. The method of claim 6, wherein the step of calculating a return factor coefficient comprises solving the equation:

$$r_i = \beta^s(s_j + m) + \epsilon.$$

10. The method of claim 6, wherein the step of calculating a return factor coefficient comprises solving the equation:

$$r_i = \begin{cases} \beta_i^m m + \beta_i^s s_j + \varepsilon, & \text{if } |m| \leq c; \\ (\beta_i^m + \delta_i^m)m + (\beta_i^s + \delta_i^s)s_j + \varepsilon, & \text{if } |m| > c. \end{cases}$$

11. The method of claim 6, wherein the step of calculating a return factor coefficient comprises solving the equation:

$$r_i = \beta^e e + \varepsilon.$$

12. The method of claim 6, wherein the step of calculating a return factor coefficient comprises solving the equation:

$$r_i = \beta^e e + \varepsilon.$$

13. The method of claim 6, wherein the step of calculating a return factor coefficient comprises solving the equation:

$$r_i = \beta^m m + \beta^e e + \varepsilon.$$

14. A system for determining fair value prices of financial securities of international markets, comprising:
  means for selecting a universe of securities of a particular international market;
  means for computing overnight returns of each security in the selected universe over a predetermined past period of time;
  means for determining out-of-sample or back-testing performance of a plurality of return factors;
  means for selecting at least one return factor of a domestic financial market from the plurality of return factors, based on at least the determined out-of-sample or back-testing performance;
  means for computing, for each selected return factor, the return factor's daily return over said predetermined past period of time;
  means for calculating, for each selected return factor, a return factor coefficient for each security in the selected universe by performing a time series regression to obtain the contribution of each return factor's return to the security's overnight return; and
  means for storing each calculated return factor coefficient in a data file;
  wherein the stored return factor coefficients can be used in conjunction with current return factor daily return values to predict current overnight returns for all securities in the selected universe of securities, which predicted current overnight returns can be used in conjunction with closing prices on said particular international market of each security of said selected universe to determine a fair value price of each security of said selected universe.

15. The system of claim 14, wherein said means for selecting the universe of securities comprises means for selecting securities from the group of substantially all relatively active securities in a selected international market.

16. The system of claim 14, wherein said means for computing overnight returns uses historical price data to compute overnight returns of each said security over said predetermined past period of time.

17. The system of claim 14, wherein said plurality of return factors includes domestic market return, domestic sector return, exchange traded fund (ETF) return for said selected international market, and American Depositary Receipt (ADR) return for each security in said selected universe.

18. The system of claim 14, wherein said means for selecting at least one return factor comprises means for selecting at least two return factors.

19. The system of claim 14, wherein said means for calculating a return factor coefficient includes means for adding a security price fluctuation factor into said time series regression.

20. The system of claim 19, wherein said means for calculating a return factor coefficient comprises solving the equation:

$$r_i = \beta^m m + \beta^s s_j + \varepsilon.$$

21. The system of claim 19, wherein said means for calculating a return factor coefficient comprises solving the equation:

$$r_i = \beta^m m + \varepsilon.$$

22. The system of claim 19, wherein said means for calculating a return factor coefficient comprises solving the equation:

$$r_i = \beta^s(s_j + m) + \varepsilon.$$

23. The system of claim 19, wherein said means for calculating a return factor coefficient comprises solving the equation:

$$r_i = \begin{cases} \beta_i^m m + \beta_i^s s_j + \varepsilon, & \text{if } |m| \leq c; \\ (\beta_i^m + \delta_i^m)m + (\beta_i^s + \delta_i^s)s_j + \varepsilon, & \text{if } |m| > c. \end{cases}$$

24. The system of claim 19, wherein said means for calculating a return factor coefficient comprises solving the equation:

$$r_i = \beta^e e + \varepsilon.$$

25. The system of claim 19, wherein said means for calculating a return factor coefficient comprises solving the equation:

$$r_i = \beta^e e + \varepsilon.$$

26. The system of claim 19, wherein said means for calculating a return factor coefficient comprises solving the equation:

$$r_i = \beta^m m + \beta^e e + \varepsilon.$$

27. A computer program product for determining fair value prices of financial securities of international markets, comprising the following computer-executable instructions stored on a computer-readable storage medium:
  computer-executable instructions for selecting a universe of securities of a particular international market;
  computer-executable instructions for computing overnight returns of each security in the selected universe over a predetermined past period of time;
  computer-executable instructions for determining out-of-sample or back-testing performance of a plurality of return factors;
  computer-executable instructions for selecting at least one return factor of a domestic financial market from the plurality of return factors, based on at least the determined out-of-sample or back-testing performance;
  computer-executable instructions for computing, for each selected return factor, the return factor's daily return over said predetermined past period of time;
  computer-executable instructions for calculating, for each selected return factor, a return factor coefficient for each security in the selected universe by performing a time series regression to obtain the contribution of each return factor's return to the security's overnight return; and computer-executable instructions for storing each calculated return factor coefficient in a data file;

wherein the stored return factor coefficients can be used in conjunction with current return factor daily return values to predict current overnight returns for all securities in the selected universe of securities, which predicted current overnight returns can be used in conjunction with closing prices on said particular international market of each security of said selected universe to determine a fair value price of each security of said selected universe.

28. The computer program product of claim 27, wherein the instructions for selecting the universe of securities include instructions for selecting securities from the group of substantially all relatively active securities in a selected international market.

29. The computer program product of claim 27, wherein the instructions for computing overnight returns uses historical price data to compute overnight returns of each said security over said predetermined past period of time.

30. The computer program product of claim 27, wherein said plurality of return factors includes domestic market return, domestic sector return, exchange traded fund (ETF) return for said selected international market, and American Depositary Receipt (ADR) return for each security in said selected universe.

31. The computer program product of claim 27, wherein the instructions for selecting at least one return factor include instructions for selecting at least two return factors.

32. The computer program product of claim 27, wherein the instructions for calculating a return factor coefficient include instructions for adding a security price fluctuation factor into said time series regression.

33. The computer program product of claim 32, wherein the instructions for calculating a return factor coefficient comprises solving the equation:

$$r_i = \beta^m m + \beta^s s_j + \epsilon.$$

34. The computer program product of claim 32, wherein the instructions for calculating a return factor coefficient comprises solving the equation:

$$r_i = \beta^m m + \epsilon.$$

35. The computer program product of claim 32, wherein the instructions for calculating a return factor coefficient comprises solving the equation:

$$r_i = \beta^s(s_j + m) + \epsilon.$$

36. The computer program product of claim 32, wherein the instructions for calculating a return factor coefficient comprises solving the equation:

$$r_i = \begin{cases} \beta_i^m m + \beta_i^s s_j + \varepsilon, & \text{if } |m| \leq c; \\ (\beta_i^m + \delta_i^m)m + (\beta_i^s + \delta_i^s)s_j + \varepsilon, & \text{if } |m| > c. \end{cases}$$

37. The computer program product of claim 32, wherein the instructions for calculating a return factor coefficient comprises solving the equation:

$$r_i = \beta^e e + \epsilon.$$

38. The computer program product of claim 32, wherein the instructions for calculating a return factor coefficient comprises solving the equation:

$$r_i = \beta^e e + \epsilon.$$

* * * * *

UNITED STATES PATENT AND TRADEMARK OFFICE
CERTIFICATE OF CORRECTION

PATENT NO. : 7,533,048 B2  Page 1 of 1
APPLICATION NO. : 10/405640
DATED : May 12, 2009
INVENTOR(S) : Ananth Madhavan et al.

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 1043 days.

should read (*) Notice: Subject to any disclaimer, the term of this patent is extended or adjusted under 35 U.S.C. 154(b) by 1712 days.

Signed and Sealed this

Thirtieth Day of March, 2010

David J. Kappos
*Director of the United States Patent and Trademark Office*